Sept. 23, 1969  R. E. BERGSTROM  3,468,293
MULTI-STAGE FORCED CIRCULATION EVAPORATOR AND METHOD
Filed May 10, 1968  3 Sheets-Sheet 1
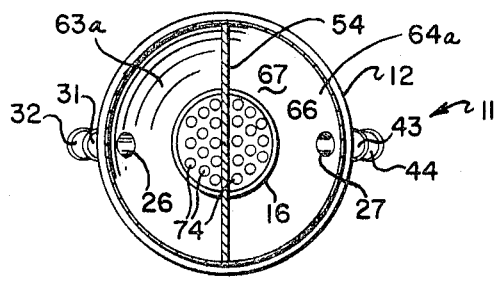
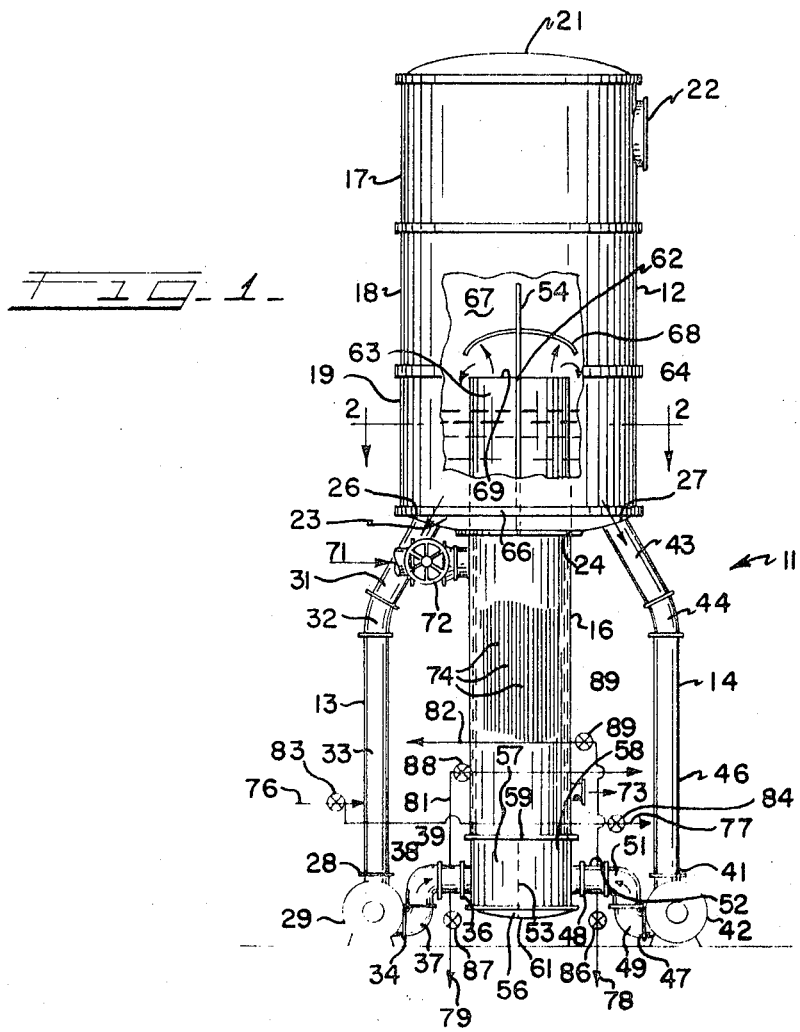
INVENTOR
RALPH E. BERGSTROM
BY
ATT'YS.

Sept. 23, 1969     R. E. BERGSTROM     3,468,293
MULTI-STAGE FORCED CIRCULATION EVAPORATOR AND METHOD
Filed May 10, 1968     3 Sheets-Sheet 2
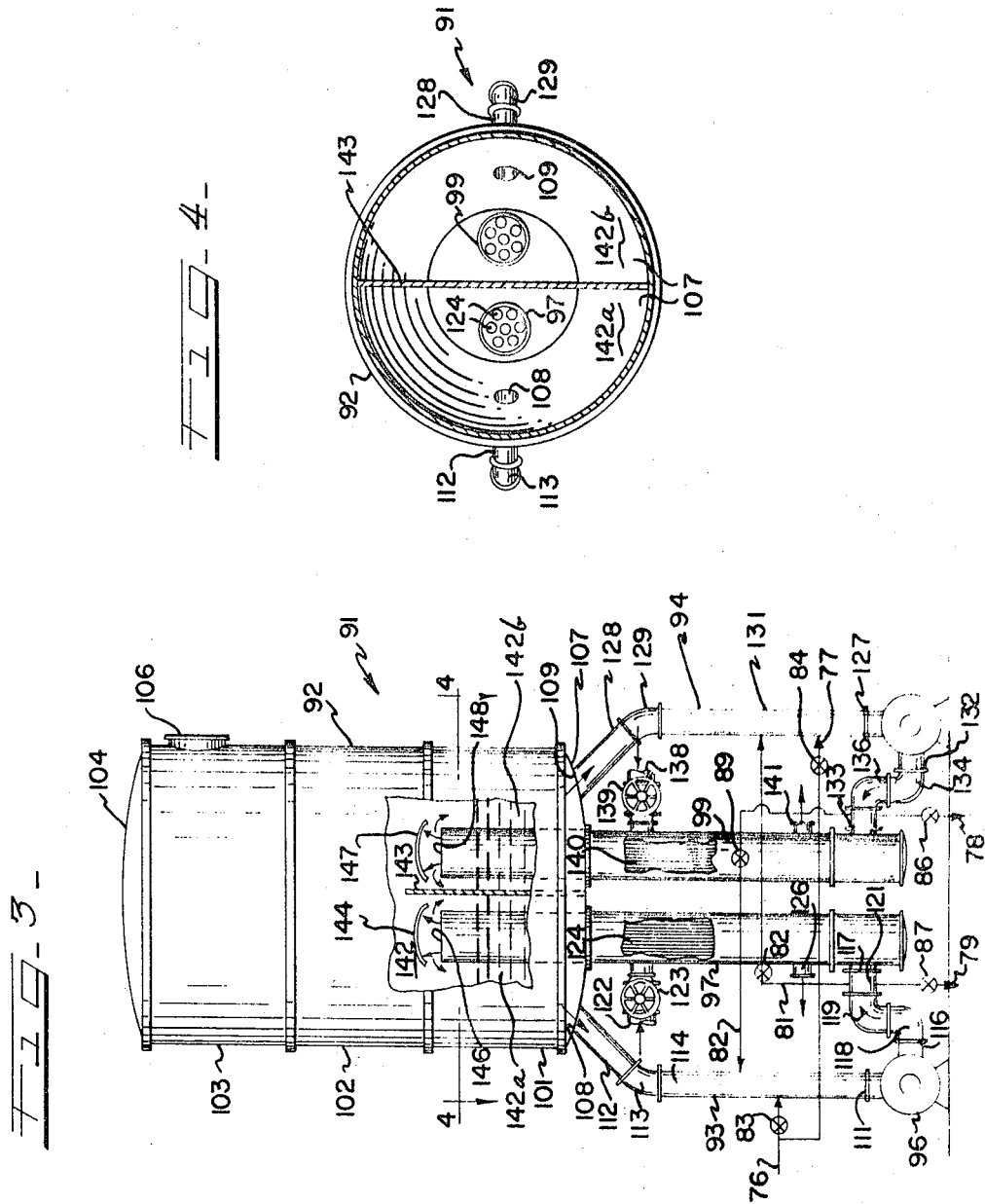
INVENTOR
RALPH E. BERGSTROM
ATT'YS.

Sept. 23, 1969    R. E. BERGSTROM    3,468,293
MULTI-STAGE FORCED CIRCULATION EVAPORATOR AND METHOD
Filed May 10, 1968    3 Sheets-Sheet 3

FIG. 5

→ TO VACUUM

INVENTOR
RALPH E. BERGSTROM
BY Dreist, Lockwood, Stanowelt
   & Dewey
            ATT'YS

United States Patent Office 3,468,293
Patented Sept. 23, 1969

3,468,293
MULTI-STAGE FORCED CIRCULATION EVAPORATOR AND METHOD
Ralph E. Bergstrom, Chicago, Ill., assignor to Whiting Corporation, a corporation of Illinois
Filed May 10, 1968, Ser. No. 728,123
Int. Cl. F22b *1/16, 37/10*
U.S. Cl. 122—34      14 Claims

ABSTRACT OF THE DISCLOSURE

A multi-stage forced circulation evaporator wherein a plurality of recycle circuits individually communicate with separate liquid containing compartments in the evaporating chamber. The evaporator is particularly intended for use in the concentrating of liquids containing dissolved solids which tend to produce a scale formation on the process side of the heat exchanger component thereof. Cross-piping means is provided whereby less concentrated liquids can be circulated through the respective recycle circuits without shutting down the evaporator in order to reduce and control the formation of scale therein.

---

This invention generally relates to an improved forced circulation evaporator and method. More particularly, this invention is directed to a multi-stage forced circulation evaporator which is particularly suitable for use in the concentrating of liquids containing dissolved solids which produce a scale formation on the process side thereof wherein the solubility of the scale so formed is inversely proportional to the solids concentration and temperature of the liquid being concentrated. In this regard, an important aspect of the present invention concerns an apparatus and method wherein a multi-stage force circulation evaporator is provided with a plurality of recycle circuits through which different concentrations of a liquid undergoing evaporation can be simultaneously and selectively circulated in order to reduce the formation of scale on the process side of such evaporator.

The present invention is particularly siutable for use in concentrating sulfate and sulfite liquors recovered in the pulp and paper manufacture. For example, in the recovery of black liquor in the so-called sulfate or kraft process for manufacturing pulp, one of the most important factors which provides for economic operation of the process involves the recovery of spent liquor from the cooking process. This black liquor is removed from the pulp in the pulp washer or diffuser and generally contains from about 95% to 98% of the total alkali charged to the digester. The black liquors being recovered generally contain sodium carbonate, sodium chloride, sodium hydroxide, sodium sulfite, sodium sulfate, lignin as well as other inorganic and organic materials. These black liquors exhibit a strong tendency to produce a scale formation on the heat exchanger surfaces of the evaporators employed in concentrating such liquors. The scales so formed are water soluble and rapidly build up, thereby necessitating frequent tube cleaning. For example, where the sulfate black liquors are being concentrated in conventional long tube vertical (LTV) evaporators which are operated to produce a product having a 65% total solids concentration, these heat exchanger tubes must be cleaned out approximately once every day or two. Typically, a boilout solution which consists of hot water and/or a weak black liquor (one containing a total solids concentration of approximately 30%) is used for this purpose. As can be appreciated, the circulation of such a boilout solution through the heat exchangers is expensive to the over-all operation not only because it requires additional labor, but also because it necessitates frequent costly shutdowns.

In accordance with the present invention, a multistate forced circulation evaporator is provided which overcomes the above described problem with respect to scale formation on heat exchanger surfaces by providing a forced circulation multi-stage evaporator which receives a black sulfate liquor feed and concentrates such feed to produce a desired product without necessitating the almost daily shutdowns encountered with the conventional LTV equipment. For example, in instances wherein the black sulfate liquor feed has a total solids concentration of approximately 50% and such feed is to be concentrated to produce a product having a total solids concentration of approximately 65%, the forced circulation multistage evaporator of the present invention can be operated for substantially extended periods of time, in the order of 10 days or more, without necessitating a shutdown for tube cleaning purposes.

The multi-stage forced circulation evaporator of the present invention is provided with a plurality of recycle circuits or stages wherein varying concentrations of the evaporated liquor are simultaneously circulated. For example, in a two stage forced circulation evaporator embodying the principles of the present invention, one stage could contain a liquor undergoing evaporation having a total solids concentration of approximately 57% by weight while the second stage could contain a black liquor having a total solids concentration of approximately 65% by weight. Since the 57% total solids liquor will exhibit an improved ability to dissolve and remove scale from the heat exchanger walls, the fluid flow through the respective circuits, in accordance with this invention, can be periodically switched so that the circuit which originally contained the 65% total solids liquor will have circulated therethrough the 57% total solids liquor and vice versa. In this manner, the formation of scale on heat exchanger surfaces in the multi-stage forced circulation evaporator is effectively controlled to substantially extend the operating cycle between boilouts.

In general, the multi-stage forced circulation evaporator of the present invention generally include a single evaporating vessel which contains the liquid undergoing evaporation at a predetermined level therein. The lower portion of the interior of the evaporating chamber is divided into a plurality of subchambers or compartments by baffles or the like which subchambers are separate from each other and which each communicate with individual recycle loops. Each of these loops is provided with a circulating pump for providing forced circulation of the recycling liquid and with means for heating the recycling liquid. The chamber is constructed with a common vapor space for all of the individual liquid containing subchambers or compartments. Cross-over piping is provided between the respective recycle loops to enable transfer of predetermined amounts of recycle liquid from one stage to another in order to provide for a continuous steady state operation in the evaporator. In addition, auxiliary feed and product discharge outlets are provided. Accordingly, flow through the individual recycle loops can be switched to provide effective removal of scale.

It is, therefore, an important aspect of the present invention to provide a new and improved forced circulation evaporator which is particularly suited for evaporating a liquid containing dissolved solids which exhibit a tendency to build up as a scale formation on the process side of the heat exchanger in the evaporator which scale is generally characterized by a solubility which is inversely proportional to the solids concentration of the liquid.

Another object of the present invention is to provide a new and improved multi-stage forced circulation evaporator which can effectively operate over extended periods of time without necessitating the frequent shutdowns which are characteristic of conventional equipment.

Another object of the present invention is to provide a new and improved multi-stage forced circulation evaporator system wherein a plurality of individual recycle loops are provided which each respectively communicate with individual liquid containing subchambers in the evaporating chamber, such subchambers being defined by baffles or the like which extend upwardly in said evaporating chamber a sufficient distance to prevent liquid in each of said respective subchambers from being transferred directly into adjacent chambers therein.

Another object of the present invention is to provide a new and improved multi-stage forced circulation evaporator which is particularly suited for concentrating sulfate and sulfite liquors to produce a product having a solids concentration in a desired amount wherein scale formation on heat exchanger surfaces is substantially reduced without reducing the solids concentration of the product so produced.

Another object of the present invention is to provide an improved method for concentrating liquids which contain a dissolved solids concentration that exhibits a tendency to build up a solids formation or crust on the process side of heaters in a forced circulation evaporator system which improved method involves the selective circulation of less concentrated liquids through the respective process sides of the equipment without shutting down such equipment.

Another object of the present invention is to provide an improved method for concentrating a dissolved solids-containing liquid which solids-containing liquid exhibits a tendency to produce a scale formation on the process side of a heater in a forced circulation evaporator which improved method involves providing the evaporator for concentrating such liquid with a plurality of separate stages or recycle loops through which the varying concentrations of the liquid are simultaneously and selectively circulated.

Other and further objects of the present invention will be apparent from the following detailed description taken in conjunction with the drawings wherein:

FIGURE 1 is an elevational view, partially broken away, of a forced circulation evaporator embodying principles of the present invention;

FIGURE 2 is a plan sectional view taken along the line 2—2 of FIGURE 1;

FIGURE 3 is an elevational view, partially broken away, of a modified forced circulation evaporator also constructed in accordance with the present invention;

FIGURE 4 is a plan sectional view taken along the line 4—4 of FIGURE 3; and

FIGURE 5 is an elevational view, partially broken away, of a further modified forced circulation evaporator which also embodies features of the present invention.

Referring to the drawings and with particular reference to FIGURES 1 and 2, the numeral 11 generally designates a two stage forced circulation evaporator embodying principles of the present invention. As is shown, evaporator 11 includes an evaporating chamber 12 and first and second recycle loops or stages 13 and 14, respectively. Each of the recycle loops 13 and 14 communicate with a heat exchanger 16 which is split on the process or liquor side only.

In the illustrated embodiment, evaporating chamber 12 includes fixed diameter body sections 17, 18 and 19 with top bottom section 17 being closed off at its upper end by a domed top section 21. A vapor outlet 22 communicates with a suitable vacuum source, such as a barometric condenser (not shown) for purposes of establishing and maintaining sub-atmospheric conditions in the interior of the chamber 12. Bottom body section 19 is closed off at its lower end by a dome shaped member 23 which is provided with a central opening 24 therein sized to receive heat exchanger 16. The opening 24 is provided with suitable sealing means, such as is well known in the art, which sealingly engages with the outer wall of heat exchanger 16.

Dome shaped member 23 is also provided with a pair of discharge recycle outlets 26 and 27 which respectively communicate with first and second recycle loops 13 and 14. In particular, discharge outlet 26 communicates with the suction side 28 of a centrifugal pump 29 through interconnected pipe sections 31, 32 and 33. The discharge outlet 34 of centrifugal pump 29 communicates with a process inlet 36 to heat exchanger 16 through interconnected pipe sections 37, 38 and 39.

The discharge outlet 27 likewise communicates with the suction side 41 of a centrifugal pump 42 through interconnected pipe sections 43, 44 and 46. The discharge side 47 of centrifugal pump 42 communicates with a process inlet 48 through interconnected pipe sections 49, 51 and 52.

In accordance with an important aspect of the present invention, the process side of heat exchanger 16 is split into two separate liquor heating sections by means of a lower partition member 53 and an upper partition member 54. As is shown, lower partition member 53 divides the liquor receiving inlet chamber 56 into a pair of separate subchambers 57 and 58 and extends from the tube inlet plate 59 to the bottom cover plate 61 of heat exchanger 16. In this manner, recycle liquor which is received in process inlet 36 passes into subchamber 57 only. Likewise, recycle liquor which is received in process inlet 48 will pass into subchamber 58 only.

Upper partition member 54 likewise divides the process outlet chamber 62 into two subchambers 63 and 64 and extends from tube outlet plate 66 upwardly into the interior 67 of evaporating chamber 12 to a high enough elevation so that liquor from one of the subchambers will not pass into the other subchamber. A suitable deflector or entrainment separator 68 is positioned above the outlet 69 of heat exchanger 16 so that the heated liquors which are discharged from said outlet will be directed upon the bottom surface of such deflector plate 68. As is best shown in FIGURE 2, upper partition member 54 extends completely across the interior of evaporating chamber 12.

The shell side of heat exchanger 16 is provided with an inlet 71 which is adapted to receive a suitable heating medium such as, for example, steam. A flow control valve 72 can be provided to control the flow of the heating medium into the shell side of heat exchanger 16. The lower end of the shell side of heat exchanger 16 is provided with a discharge outlet 73 through which the heating medium is discharged. Accordingly, it will be apparent that in the illustrated embodiment the heating medium is intended to flow in countercurrent fashion to the liquor flow through the heat exchanger tubes which are generally designated by the reference numeral 74. It will be appreciated, however, that the present invention is not limited to the illustrated countercurrent flow.

In accordance with the present invention, the forced circulation evaporator 11 is equipped with feed inlet 76 and auxiliary feed inlet 77, product outlet 78 and auxiliary product outlet 79, and by-pass flow line 81 and auxiliary by-pass flow line 82 which interconnect the first recycle flow loop 13 with the second recycle flow loop 14. Suitable valves are provided so that these respective inlets and by-pass conduits can be operated in accordance with the present invention. For example, feed inlet 76 and auxiliary feed inlet 77 are respectively provided with flow control valves 83 and 84. Likewise, product discharge outlet 78 and auxiliary product discharge outlet 79 are respectively equipped with valves 86 and 87 with by-pass flow line 81 and auxiliary by-pass flow line 82 being respectively equipped with flow control valves 88 and 89.

In instances wherein feed inlet 76, product discharge outlet 78 and by-pass flow line 81 are employed, valves 83, 86 and 88 will be open and valves 84, 87 and 89 will be closed. Correspondingly, when the auxiliary feed inlet 77, auxiliary product discharge outlet 79 and auxiliary by-pass line 82 are used, valves 84, 87 and 89 will be open and valves 83, 86 and 88 will be closed.

The two stage forced circulation evaporator 11 of the present invention finds advantageous utility in the pulp and paper mill industry for concentrating sulfate and sulfite liquors. These liquors generally contain a dissolved solids concentration which builds up as scale on the interior walls of the heat exchanger tubes 74. The solubility of this scale is inversely proportional to the total solids concentration of the liquid. Typically, in conventional equipment, scale formed in this manner is removed during a boilout operation by pumping a weak black liquor through the heat exchanger tubes. Such boilout operations with conventional equipment must be done approximately once every two days. By comparison, when the forced circulation evaporator of the present invention is operated in accordance with the method of the present invention, the previously described boilout operation need only be made about once every two weeks. Of course, while the present invention finds advantageous utility in the pulp and paper mill industry for concentrating sulfate and sulfite liquors, it can be generally employed to concentrate other liquors which contain a dissolved solids concentration which builds up on the heat exchanger surfaces in the form of a scale formation, the solubility of which is inversely proportional to the concentration of the liquors being circulated therethrough.

For illustrative purposes only, the operation of forced circulation evaporator 11 will be described in connection with the evaporating and concentrating of a waste sulfate liquor containing a 50% total solids concentration to produce a concentrated product having a 65% total solids concentration.

The sulfate liquor feed containing a 50% total solids concentration would be introduced into the first recycle loop 13 through feed inlet 76. For this purpose, inlet valve 83 would be open and auxiliary inlet valve 84 would be closed. The recycle liquor contained in the first recycle loop 13, heat exchanger liquor-receiving subchamber 57, heat exchanger process outlet subchamber 63 and surrounding hemi-annular area 63a would have a total solids concentration of approximately 57% by weight. Likewise, the second recycle loop 14, liquor-receiving inlet subchamber 52, heat exchanger process outlet subchamber 64 and surrounding hemi-annular 64a would have a total solids concentration of approximately 65% by weight. The steam inlet 71 would receive a suitable heating medium such as, for example, steam having a gauge pressure of approximately 50 to 90 pounds per square inch which would be discharged from the heater 16 at the steam discharge outlet 73. Suitable liquor velocities through the heat exchanger 74 would generally range from approximately 3 feet to 20 feet per second. A predetermined amount of 57% recycle liquor from the first recycle loop 13 is transferred to the second recycle loop 14 through interconnecting line 81. For this purpose, valve 88 would be open and valve 89 would be closed. A 65% total solids product will be discharged through product outlet 78. For this purpose, valve 86 will be open and valve 87 will be closed. The amount of 57% total solids recycle liquor transferred between the first recycle loop 13 and second recycle loop 14 will be controlled by the relative amounts of feed introduced at 76, product discharged at 78, and vapor evolved in the evaporating chamber 12. Since the scale formed on the interior of heat exchanger tubes 74 is water soluble, there will be a greater buildup of scale on the heat exchanger tubes which form a part of the second recycle loop 14. This scale buildup, however, is effectively controlled and substantially reduced in accordance with the present invention by periodically reversing the concentration of the recycle liquor in each of the respective recycle loops 13 and 14. In other words, periodically, first recycle loop 13 would have a liquor containing a 65% total solids concentration circulated therethrough and the second recycle loop 14 would have a liquor containing a 57% total solids concentration circulated therethrough. In order to achieve this result, inlet valve 83 would be closed and auxiliary inlet valve 84 would be open. Likewise, product discharge valve 86 would be closed and auxiliary product discharge valve 87 would be open. Similarly, when steady state conditions were achieved, by-pass valve 81 would be closed and auxiliary by-pass valve 89 would be open so that the desired amount of flow from recycle loop 14 would be transferred to recycle loop 13. By reversing the two stages in this manner, the 57% total solids liquor would dissolve the accumulated carbonaceous deposits which would have built up on the interior of the tube walls associated with the second recycle loop 14. This procedure would be followed until it was desired to reverse the concentration again in order to dissolve the accumulated carbonaceous deposits in the heat exchanger tubes associated with the first recycle loop 13.

Since the heat transfer coefficient associated with the 57% total solids liquor is greater than that associated with the 65% total solids liquor, the two stage forced circulation evaporator 11 would have a greater capacity than would a single stage forced circulation evaporator which contained a 65% total solids circulating liquor only. Also, horsepower requirements for the two stage forced circulation evaporator 11 will be substantially reduced due to the lower viscosity of the 57% total solids liquor. Accordingly, the two stage forced circulation evaporator 11 shown in the illustrated embodiment offers a number of important advantages which include: longer operating periods between boilouts, reduced horsepower requirements, and increased capacity.

While the embodiment shown in FIGURES 1 and 2 included two recycle loops or stages only, it will be appreciated that additional recycle loops could be incorporated therein in a manner which would be obvious to one skilled in this art. For example, a third recycle loop could be provided with its own separate circulating pump and inlet and outlet subchambers so that three different concentrations of recycle liquid could be simultaneously circulated through such evaporator with periodic switching of such concentrations being made to achieve the various advantages of the present invention discussed above.

Referring to FIGURES 3 and 4, a two stage forced circulation evaporator 91 is shown which includes an evaporating chamber 92 and first and second recycle loops or stages 93 and 94, respectively. As is shown, the first recycle loop 93 is equipped with a circulating pump 96 and heat exchanger 97. Likewise, the second recycle loop 94 is equipped with a circulating pump 98 and heat exchanger 99. Accordingly, the embodiment illustrated in FIGURES 3 and 4 generally corresponds to the previously described embodiment of FIGURES 1 and 2 with the exception that the FIGURES 3 and 4 embodiment is equipped with separate heat exchangers 97 and 99 instead of the common single shell heat exchanger 16 shown in FIGURES 1 and 2.

As is shown in the embodiment illustrated in FIGURES 3 and 4, evaporating chamber 92 is formed of three fixed diameter sections 101, 102 and 103. Top section 103 is closed off at its upper end by a domed cover member 104 and is also provided with a vapor outlet 106 which communicates with a suitable vacuum source (not shown). Likewise, bottom fixed diameter section 101 is closed off at its lower end by domed bottom cover member 107. Heat exchangers 97 and 99 extend upwardly through bottom cover member 107 into the interior of the evaporating chamber 92. Bottom cover member 107 is also provided with a pair of recycle discharge outlets 108 and 109 which respectively communicate with first and second recycle loops 93 and 94.

Recycle discharge outlet 108 communicates with the suction side 111 of circulating pump 96 by means of interconnected pipe sections 112, 113 and 114. The discharge side 116 of circulating pump 96 communicates with the process inlet side 117 of heat exchanger 97 through interconnected pipe sections 118, 119 and 121.

The shell side of heat exchanger 97 is provided with an inlet 122 equipped with a suitable throttling valve 123 through which a suitable heating medium such as steam can be introduced into the interior of the shell side of the heat exchanger 97 for heating the tubes 124 thereof. A heating medium discharge outlet 126 communicates with the interior of the shell side of heat exchanger 97 adjacent the lower end thereof.

Recycle discharge outlet 109 communicates with the suction side 127 of circulating pump 98 through interconnected pipe sections 128, 129 and 131. Discharge side 132 of circulating pump 98 communicates with the process inlet 133 of heat exchanger 99 through interconnected pipe sections 134, 136 and 137.

The shell side of heat exchanger 99 is likewise provided with an inlet 138 connected to a suitable heating medium supply source (not shown) and is equipped with a throttling valve 139. A suitable heating medium such as steam can thereby be introduced into the shell side of heat exchanger 99 for heating heat exchanger tubes 140. A heating medium discharge outlet 141 is provided adjacent the lower end of the shell side of heat exchanger 99.

The interior 142 of evaporating chamber 92 is divided adjacent the lower end thereof into two separately contained subchambers 142a and 142b by a vertically extending partition member 143. Partition member 143 extends to a sufficient elevation in chamber 92 so that the liquid in subchamber 142a is kept separate from the liquid in subchamber 142b. A deflector or entrainment separator plate 144 overlies in spaced away relation the process outlet end 146 of heat exchanger 97. Likewise, a deflector or entrainment separator 147 overlies in spaced away relation the outlet end 148 of the process side of heat exchanger 99.

The primary and auxiliary feed inlets, primary and auxiliary product discharge outlets, and primary and auxiliary by-pass interconnecting piping as well as the valves associated therewith are identified by like numerals with respect to those shown and described in the embodiment shown in FIGURES 1 and 2. Accordingly, the description of these particular components as set forth above is incorporated by reference herein.

Referring to FIGURE 5, a two stage submerged heater type forced circulation evaporator is diagrammatically shown which generally includes an evaporating chamber 152 and first and second recycle loops or stages 153 and 154. The submerged heater type forced circulation evaporator shown herein is particularly suitable for concentrating heavy, viscous liquids and finds advantageous utility in concentrating numerous liquids which contain dissolved solids that exhibit a tendency to form scale on heat exchanger surfaces such as, for example, electrolytic caustic.

In the illustrated embodiment, evaporating chamber 152 is provided with three fixed diameter body sections 156, 157 and 158. The upper end of top body section 158 is closed off by a domed cover member 159 which is provided with a centrally disposed outlet 161 that communicates with a suitable vacuum source (not shown). Bottom section 156 is closed off at its lower end by a generally conical bottom cover member 162 fitted with a pair of recycle discharge outlets 163 and 164 which respectively communicate with first and second recycle loops 153 and 154.

Recycle discharge outlet 163 is respectively interconnected to the suction side 166 of a centrifugal pump 167 through interconnected pipe sections 168, 169, 171, 172 and 173. Centrifugal pump 167 is driven by suitable drive means 174. The discharge side 176 of centrifugal pump 167 is interconnected to the process inlet side 177 of heat exchanger 178 by a pipe section 179. The process discharge outlet 181 of heat exchanger 178 is connected to a recycle inlet 182 of evaporating chamber 152 by a series of interconnected pipe sections 183, 184 and 186.

Recycle discharge outlet 164 is interconnected to the suction side 187 of a centrifugal pump 188 through a series of interconnected pipe sections 189, 191, 192 and 193. Centrifugal pump 188 is driven by suitable drive means 194. As is shown, the discharge side 196 of centrifugal pump 188 is interconnected to the process inlet side 197 of heat exchanger 198 by pipe section 199. The process outlet side 201 of heat exchanger 198 communicates with a recycle inlet 202 in evaporating chamber 152 by interconnected pipe sections 203, 204 and 206.

A vertically extending partition member 207 subdivides the interior 208 of evaporating chamber 152 into two subchambers 209 and 211, both of which communicate with a common vapor head 212. Partition member 207 extends completely across the interior of evaporating chamber 152 and is sufficiently high so as to prevent the transfer of liquid between subchambers 209 and 211. A liquid level 213 is maintained in evaporating chamber 152 above recycle inlets 182 and 202 in order to provide a liquid head in the system which acts to prevent boiling in the heat exchanger tubes 178a of heat exchanger 178 and heat exchanger tubes 198a of heat exchanger 198. Accordingly, partition member 207 operates to provide two separate recycle stages 153 and 154 and thereby enables the simultaneous evaporating and concentrating of two liquids of different concentrations in evaporating chamber 152.

Since the primary feed inlet, auxiliary feed inlet, primary product discharge outlet, auxiliary product discharge outlet, primary by-pass flow line, and auxiliary by-pass flow line together with the valves associated therewith correspond identically to those previously described in connection with the embodiment of FIGURES 1 and 2, like reference numerals have been used to designate such components in the FIGURE 5 embodiment. Accordingly, the description of such components as set out above is incorporated by reference herein.

While for illustrative purposes each of the embodiments of the present invention have been of a two stage or dual recycle loop construction, it will be readily apparent to those skilled in the art that the principles of the present invention also find advantageous utility in the construction of multistage forced circulation evaporators which include three or more recycle loops or stages. Likewise, other modifications and variations from the described embodiments will be apparent to those skilled in this art and may be made without departing from the spirit and scope of the present invention. Accordingly, this invention is to be limited only by the scope of the appended claims.

I claim:

1. A multi-stage forced circulation evaporator comprising an evaporating vessel adapted to contain a liquid undergoing evaporation, means in said evaporating vessel defining at least two liquid containing chambers which are separate from each other and which communicate with a common vapor head in said evaporating vessel, separate recycle flow means communicating with each of said liquid containing chambers, each of said recycle flow means including means for heating said liquid and pump means for providing forced circulation of the liquid therethrough, and by-pass means communicating one of said recycle flow means with another of said recycle flow means, said by-pass means being provided with flow control means for selectively regulating the amount of liquid transferred between said recycle flow means.

2. The multi-stage forced circulation evaporator of claim 1 wherein the heater means for all of said recycle flow means comprises a heat exchanger having a process inlet and a process outlet chamber at each end with tubes connecting said chambers, partitioning means dividing each of said chambers into separate subchambers which are arranged to define a plurality of separate process flow channels in said heat exchanger, and each of said separate process flow channels communicating with one of said recycle flow means.

3. The multi-stage forced circulation evaporator of claim 2 wherein the partitioning means in the process outlet chamber of said heat exchanger also defines the separate liquid containing chambers in said evaporating vessel.

4. The multi-stage forced circulation evaporator of claim 1 wherein each of said heating means is located externally of said evaporating vessel and below the liquid level therein.

5. A forced circulation evaporator, comprising an evaporating chamber adapted to contain a liquid undergoing evaporation, means in said evaporating vessel defining at least first and second liquid containing chambers which are separate from each other and which each communicate with a common vapor head in said evaporating vessel, each of said first and second liquid containing chambers respectively communicating with first and second recycle flow means, said first recycle flow means including heating means and a pump for withdrawing a recycle stream of said liquid from said first liquid containing chamber by forced circulation and heating said recycle liquid prior to return thereof to said first liquid containing chamber, said second recycle flow means including heating means and a pump for withdrawing a recycle stream of said liquid from said second liquid containing chamber by forced circulation, and heating said recycle liquid prior to return thereof to said second liquid containing chamber, said first recycle flow means including a feed inlet, said second recycle flow means including a product outlet, by-pass means communicating said first recycle flow means with said second recycle flow means, said by-pass means being provided with flow control means for selectively regulating the amount of liquid transferred from said first recycle flow means to said second recycle flow means, said second recycle flow means being provided with an auxiliary feed inlet, said first recycle flow means being provided with an auxiliary product outlet, said feed inlet, product outlet, auxiliary feed inlet and auxiliary product outlet each being provided with valve means.

6. The multi-stage forced circulation evaporator of claim 5 wherein the heater means for said first and second recycle flow means comprises a heat exchanger having a process inlet and a process outlet chamber at each end with tubes connecting said chambers, partitioning means dividing each of said chambers into at least first and second separate subchambers which are arranged to define first and second separate process flow channels in said heat exchanger, said first and second separate process flow channels each respectively communicating with said first and second recycle flow means.

7. The multi-stage forced circulation evaporator of claim 6 wherein the partitioning means in the process outlet chamber of said heat exchanger also defines the first and second liquid containing chambers in said evaporating vessel.

8. The multi-stage forced circulation evaporator of claim 5 wherein each of said heating means is located externally of said evaporating vessel and below the liquid level therein.

9. A multi-stage forced circulation evaporator which is particularly adapted to concentrate a liquid containing dissolved solids which liquid upon being concentrated produces a scale formation on heat exchanger surfaces wherein the solubility of the scale formation so formed is inversely proportional to the solids concentration or temperature of the liquid being evaporated, said evaporator comprising an evaporating vessel adapted to contain a solids containing liquid undergoing evaporation, means in said evaporating vessel defining at least first and second liquid containing chambers which are separate from each other and which communicate with a common vapor head in said evaporating vessel, first and second recycle flow means respectively communicating with said first and second liquid containing chambers, each of said recycle flow means including heating means and pump means, by-pass means communicating said first recycle flow means with said second recycle flow means, said by-pass means being provided with valve means for selectively regulating the amount of liquid transferred between said recycle flow means, said first liquid containing chambers and the first recycle flow means associated therewith being adapted to contain a liquid having a selectively controlled solids concentration different from that present in said second liquid containing chamber and second recycle flow means, said first recycle flow means including a feed inlet, said second recycle flow means including a feed inlet, said second recycle flow means including a product outlet, said second recycle flow means being provided with an auxiliary feed inlet, said first recycle flow means being provided with an auxiliary product outlet, said feed inlet, product outlet, auxiliary feed inlet and auxiliary product outlet each being provided with valve means.

10. The multi-stage forced circulation evaporator of claim 9 wherein the heater means for said first and second recycle flow means comprises a heat exchanger having a process inlet and a process outlet chamber at each end with tubes connecting said chambers, partitioning means dividing each of said chambers into at least first and second separate subchambers which are arranged to define first and second separate process flow channels in said heat exchanger, said first and second separate process flow channels each respectively communicating with said first and second recycle flow means.

11. The multi-stage forced circulation evaporator of claim 10 wherein the partitioning means in the process outlet chamber of said heat exchanger also defines the first and second liquid containing chambers in said evaporating vessel.

12. The multi-stage forced circulation evaporator of claim 9 wherein each of said heating means is located externally of said evaporating vessel and below the liquid level therein.

13. The method of evaporating a liquid feed containing a certain dissolved solids concentration to produce a liquid product containing a greater dissolved solids concentration which liquid is characterized by a tendency to produce a scale formation having a solubility which is inversely proportional to the solids concentration of the liquid, said method comprising the steps of: circulating at least two separate bodies of liquid through at least two separate fluid flow circuits in a forced circulation evaporator, each of said circuits including a separate liquid containing chamber in an evaporating vessel, a discharge outlet from said vessel, a pump, a heater, and a return inlet to said separate liquid containing chamber; controlling the solids concentration of the liquid bodies in each of said fluid flow circuits so that one of said liquid bodies has a lower solids concentration than the remaining liquid body, and selectively switching the solids concentration in said evaporator circuits so that said lower concentration liquid body can be selectively circulated through each of said circuits to control scale formation in said circuits without necessitating shutdown of said evaporator.

14. The method of claim 13 wherein the liquid flow through the tubes in said heaters ranges from approximately 3 feet to 20 feet per second.

References Cited

UNITED STATES PATENTS

| | | | |
|---|---|---|---|
| 482,340 | 9/1892 | Cooper | 122—34 |
| 2,796,050 | 6/1957 | Rehm | 122—32 |
| 2,907,305 | 10/1959 | Profos | 122—379 |
| 3,213,834 | 10/1965 | Heathcote et al. | 122—379 |

KENNETH W. SPRAGUE, Primary Examiner

U.S. Cl. X.R.

122—379